(12) United States Patent
Yang et al.

(10) Patent No.: US 8,751,485 B2
(45) Date of Patent: Jun. 10, 2014

(54) SYSTEM AND METHOD FOR PROVIDING LOAN WORD SEARCH SERVICE

(75) Inventors: Mi Seung Yang, Seongnam-si (KR); Hyo Min Kim, Seongnam-si (KR); Taeil Kim, Seongnam-si (KR); Jin-hwan Yoo, Seongnam-si (KR); Ui Chung Chung, Seongnam-si (KR); Uiyoung Kim, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 0 days.

(21) Appl. No.: 13/478,000

(22) Filed: May 22, 2012

(65) Prior Publication Data

US 2012/0303657 A1    Nov. 29, 2012

(30) Foreign Application Priority Data

May 25, 2011    (KR) .................. 10-2011-0049554

(51) Int. Cl.
    *G06F 17/30*    (2006.01)
(52) U.S. Cl.
    USPC ........................... 707/722; 707/759; 707/769
(58) Field of Classification Search
    USPC ................ 707/692, 759, 769, 722; 715/264
    See application file for complete search history.

(56) References Cited

U.S. PATENT DOCUMENTS

| | | | | |
|---|---|---|---|---|
| 6,983,248 | B1 * | 1/2006 | Tahara et al. ................. | 704/255 |
| 8,321,442 | B2 * | 11/2012 | Huang .......................... | 707/760 |
| 2005/0182558 | A1 * | 8/2005 | Maruta ......................... | 701/200 |
| 2007/0244866 | A1 * | 10/2007 | Mishkanian et al. ............. | 707/3 |
| 2008/0091660 | A1 * | 4/2008 | Jang et al. ........................ | 707/3 |
| 2009/0157383 | A1 * | 6/2009 | Cho et al. .......................... | 704/8 |
| 2009/0265158 | A1 * | 10/2009 | Barlow ............................. | 704/2 |
| 2009/0282037 | A1 * | 11/2009 | Choi et al. ........................ | 707/6 |
| 2009/0292696 | A1 * | 11/2009 | Shuster ............................ | 707/5 |
| 2010/0161618 | A1 * | 6/2010 | Kim et al. ...................... | 707/748 |
| 2011/0106792 | A1 * | 5/2011 | Robertson ..................... | 707/723 |
| 2011/0282868 | A1 * | 11/2011 | Ishii ............................... | 707/722 |
| 2011/0313773 | A1 * | 12/2011 | Yamada et al. ................ | 704/270 |
| 2012/0226687 | A1 * | 9/2012 | Xu et al. ........................ | 707/728 |
| 2013/0006629 | A1 * | 1/2013 | Honda et al. ................... | 704/236 |

FOREIGN PATENT DOCUMENTS

KR    10-2010-0013358    2/2010

OTHER PUBLICATIONS

Lee, Jae Sung, "The Refinement Effect of Foreign Word Transliteration Query on Meta Search," Apr. 2008, Korea Information Processing Society, 15-B, No. 2, Republic of Korea.

* cited by examiner

*Primary Examiner* — Phong Nguyen
(74) *Attorney, Agent, or Firm* — Greer Burns & Crain Ltd.

(57) ABSTRACT

Provided is a search result providing system and method for providing a loan word pronunciation service. The search result providing system includes a storage device, an original word-allomorph maintaining unit configured to store an original word, a loan word corresponding to the original word, and a first allomorph of the original word; a related loan word searching unit configured to find a related loan word from the original word-allomorph maintaining unit in response to a query, in which the related loan word is related in pronunciation with at least one of the original word, the loan word, and the first allomorph; and a related loan word providing unit configured to expose at least one related loan word as a search result.

19 Claims, 6 Drawing Sheets

| 鹿児島 | Search |

Kagoshima / 鹿児島県 (Japan): Prefecture, Cities, Towns and ...
www.citypopulation.de/.../japan-kagoshima... - Cached - Translate this page
40+ items – Population statistics and maps for prefecture as well as for cities ...

ファイル :Kagoshima City View Bus 679.jpg - Wikipedia
Ja.wikipedia.org/.../ファイル :Kagoshima_City Transportation Bureau Bus....
License plate, Kagoshima 22 Ki 679. Chassis, Hino... 鹿児島市交通局...

| Kagosima | Search |

Related loan word pronunciation    Kagosima   鹿児島   Gagoshima   Gagosima ...

410 — | Show meaning | Play pronunciation | — 420

Related query   Japan   Miyazaki   Fukuoka   Hakata ...

SYSTEM AND METHOD FOR PROVIDING LOAN WORD SEARCH SERVICE

CROSS-REFERENCE TO RELATED APPLICATION

This application claims priority from and the benefit of Korean Patent Application No. 10-2011-0049554, filed on May 25, 2011, which is hereby incorporated by reference for all purposes as if fully set forth herein.

BACKGROUND

1. Field

The following description relates to a system and method for providing a loan word pronunciation search service.

2. Discussion of the Background

Generally, queries, that is, words input by a user to search for information, may be classified into a native word or an original word, which may be a word provided in a native language of the user, and a loan word. The loan word may refer to a word originating from a foreign language, which may be subsequently transliterated into a native word with a similar pronunciation. For example, an original word in a first language (e.g., English), such as "television" may be transliterated into a loan word in a second language, which may have similar pronunciation but may be spelled in a second language (e.g., Korean). The loan word may refer to the transliterated word in the second language of the original word spelled in the first language. Generally, the loan word is not considered to be a part of a standard language, since the loan word may be a transliterated word meant to capture pronunciation of the original word, and therefore, may be written in variable forms, with similar pronunciations, in a native language. For example, if a native language is English and a loan word originates from Korean, the loan word '리퍼' written in Korean alphabet, may be transcribed in various forms using the English alphabet, such as 'refer,' 'lipper,' 'reaper,' and 'reefer.'

Thus, a loan word may be written in various forms based on pronunciation of the loan word. However, according to a conventional system, a query inputted by a user may provide a search result, which provides one corresponding original word or loan word with respect to the query inputted by the user. More specifically, there is a one to one relationship between the original word and loan word, although there may be various ways to spell the same word. For example, if the loan word '리퍼' is provided in Korean alphabet, only the transcribed word of 'refer' may be provided according to the conventional system. Therefore, the user may be provided with limited information corresponding to the input query. That is, in order to obtain more information, the user would need to repeat a search using several forms or spelling, with similar pronunciations, of the loan word.

Accordingly, a system and method for providing a more efficient search result is related to a loan word will be introduced hereinafter.

The above information disclosed in this Background section is provided for enhancement of understanding of the background of the invention and therefore it may contain information that does not form any part of the prior art nor what the prior art may suggest to a person of ordinary skill in the art.

SUMMARY

Exemplary embodiments of the present invention provide a system and method for providing a search result related to various pronunciations of a loan word to a user who inputs a loan word as a query.

Additional features of the invention will be set forth in the description which follows, and in part will be apparent from the description, or may be learned by practice of the invention.

An exemplary embodiment of the present invention provides a search result providing system including an original word-allomorph maintaining unit configured to store an original word, a loan word corresponding to the original word, and a first allomorph of the original word; a related loan word searching unit configured to find a related loan word from the original word-allomorph maintaining unit in response to a query, in which the related loan word is related in pronunciation with at least one of the original word, the loan word, and the first allomorph; and a related loan word providing unit configured to expose the related loan word as a search result.

An exemplary embodiment of the present invention provides a search result providing method using a processor and a storage device including storing, using the processor, in a database (DB) on the storage device, an original word, a loan word corresponding to the original word, and a first allomorph; finding a related loan word from the DB in response to a query, in which the related loan word is related in pronunciation with at least one of the original word, the loan word, and the first allomorph; and exposing the related loan word as a search result on a terminal.

An exemplary embodiment of the present invention provides a non-transitory computer-readable medium including an executable program, which when executed performs a method for providing a search result including storing, in a database (DB), an original word, a loan word corresponding to the original word, and a first allomorph; finding a related loan word from the DB in response to a query comprising a query word, in which the related loan word is related in pronunciation with at least one of the original word, the loan word, and the first allomorph; and exposing the related loan word as a search result on a terminal.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as being limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Throughout the drawings and the detailed description, unless otherwise described, like reference numerals in the drawings denote like elements, features, and structures.

It will be understood that when an element is referred to as being "connected to" another element, it can be directly connected to the other element, or intervening elements may be present. In contrast, when an element is referred to as being "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
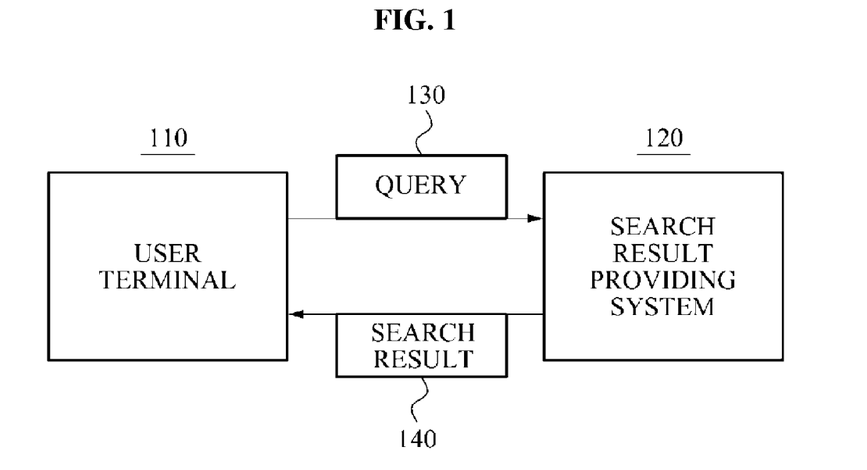
FIG. 1 is a diagram illustrating a method for providing a search service according to an exemplary embodiment of the present invention.

FIG. 1 is a diagram illustrating a method for providing a search service according to an exemplary embodiment of the present invention.

A user terminal 110 and a search result providing system 120 are shown in FIG. 1. The user terminal 110 may be a device or module, which is inputted with a query 130 by a user and transmits the query 130 to the search result providing system 120. Also, if the search result providing system 120 provides a search result 140 corresponding to the query 130, the user terminal 110 may receive the search result 140 and provide the search result 140 to the user. In an example, the user terminal 110 may refer to a device, without limitation, such as a personal computer (PC), a mobile computing device, or a smart phone, which may transmit the query 130 through a network connection with the search result providing system 120 via a wired or wireless network and receives the search result 140. Also, the user terminal 110 may refer to a module included in the search result providing system 120, that is, an input interface to receive the query 130 and an output interface to provide the search result 140.

The search result providing system 120 may generate the search result 140 corresponding to the query 130, which was transmitted through the user terminal 110, and transmit the search result 140 to the user terminal 110. As the search result 140 is output through the user terminal 110, the user may be provided with the search result 140 corresponding to the query 130.

Here, the search result providing system 120 may provide a loan word pronunciation service. That is, the query 130 may include a loan word, which may be a word spelled in a foreign language. Therefore, if the user inputs the query 130 including the loan word, the search result providing system 120 may provide the user with multiple transliterated words in a native language, which may correspond to various pronunciations of a loan word through the loan word pronunciation service. Herein, the loan word may include a transliterations of an original word, and one or more allomorphs, which may refer to various transliteration of the original word, which may have similar pronunciations. One original word may match an n-number of loan words, or various spellings in a foreign language of the same word. For example, if the native language is English, the loan word may include the transliteration of the original word, and one or more allomorphs, or variations of the transliteration of the original word with different spelling while expressing similar pronunciation as the original word. Accordingly, the original word in a native language, the loan word in the foreign language, which may include the transliteration of the original word and allomorphs, may have similar pronunciation even though they may be spelled differently.

Here, the search result providing system 120 may store and maintain a set of allomorphs of the original word as words having similar pronunciations or pronunciation relations. If a query that includes the original word or some of the allomorphs is input through the user terminal 110 and transmitted, the search result providing system 120 may provide the user terminal 110 with the original word or the allomorphs with the pronunciation relations, thus providing the user with various pronunciations of the loan word. For example, if the user inputs the original word as the query, the search result providing system 120 may provide various allomorphs with the pronunciation relations of the original word. Also, if the user inputs the allomorphs as the query, the search result providing system 120 may provide at least one allomorph different from the transliteration of the original word, which may be related in the pronunciation of the inputted allomorph.

To establish a relation in pronunciation between the original word and the allomorphs, a method for generating an actual pronunciation of the original word may be provided. For this purpose, the search result providing system 120 may establish at least one allomorph for one original word using a pronunciation search library that may store and maintain the set of allomorphs corresponding to an original word related in pronunciation. Table 1 shows an example in which the n-number of allomorphs are established for one original word.

TABLE 1

| Original word | Allomorph |
|---|---|
| 鹿児島 | Kagoshima |
|  | Kagosima |
|  | Gagoshima |
|  | Gagosima |

That is, the original word may be expressed using an alphabet of a corresponding language while the allomorphs may be expressed using an alphabet of the native language of the user. However, the original word may also be expressed by the alphabet of the native language as a whole or in part. In this case, the native language expressing the original word may have a representative form. Here, it is noted that the exemplary embodiment of the present invention is not limited to a particular language. That is, the exemplary embodiment of the present invention may be applied to various languages having loan words with regard to original words and corresponding allomorphs.

To provide an original word or one or more allomorphs of a loan word to the user who inputs the query 130 including the loan word by using a loan word pronunciation database (DB), an integrated environment may be provided, in which the set of the original word and the allomorph may be exposed or displayed in combination, according to the query 130 input by the user.

As aforementioned, the search result providing system 120 may provide the user with at least one of the original word and the allomorph as the search result. Therefore, a standard for data integration and service exposure may be used. For example, if multiple original words or multiple allomorphs are provided to the user, the exposure or display priority among the allomorphs or the original words may be determined.

That is, the search result providing system 120 may determine the original word or the allomorph having a relatively high accuracy based on a query count (QC). That is, the original word or the allomorph selected at a relatively high frequency by users may be preferentially exposed to the user.

In addition, the search result providing system 120 may allocate a weight to the QC or allocate a priority according to a source of the allomorph. With respect to the allomorphs having the same source, the search result providing system 120 may determine the priority according to the QC.

For example, the search result providing system 120 may determine an allomorph corresponding to the standard orthography of the loan word as a most accurate allomorph amongst a list of allomorphs returned as possible matches. In this case, the search result providing system 120 may provide the original word or the allomorph such that the standard orthography of the loan word is first exposed to the user. Also, while providing the original word or the allomorph according to the QC, the search result providing system 120 may allocate a weight to the allomorph corresponding to the standard orthography of the loan word.

Table 2 shows an example in which the exposure priority of allomorphs may be determined.

TABLE 2

| Source | Query count (QC) | Priority | Allomorph |
|---|---|---|---|
| Standard orthography | 100 | 1 | Kim Yeona |
| Standard orthography | 55 | 2 | Gim Yeona |
| Biographic dictionary | 300 | 3 | Kim Yun-a |
| Biographic dictionary | 130 | 4 | Gim Yun-a |

That is, according to Table 2, the search result providing system 120 determines the allomorph corresponding to the standard orthography of the loan word to have a higher exposure priority. In addition, with respect to the allomorphs having the same source, the exposure priority is determined based on the QC.

Although the allomorph corresponding to the standard orthography of the loan word has the highest exposure priority in the example shown in Table 2, such a priority determining method is only by way of example but is not limited thereto. As aforementioned, while determining the exposure priority according to the QC basically, the search result providing system 120 may determine the exposure priority by allocating a weight to the QC according to the source or determine an allomorph of another source to have a higher exposure priority.

In addition to the loan word pronunciation service, the search result providing system 120 may provide a related query service that provides a related query of the query 130 inputted by the user. Furthermore, the search result providing system 120 may provide a business keyword service that provides a business keyword related to an advertisement (ad) keyword. Since a method of providing the related keyword or the business keyword is generally known in the art, a detailed explanation about the method will be omitted for conciseness. However, if the related query provided by the related query service overlaps with the original word or the allomorph provided by the loan word pronunciation service, the search result providing system 120 according to the exemplary embodiment of the present invention may give a higher priority to the loan word pronunciation service so that the overlapping related keyword is excluded. If the original word or the allomorph provided by the loan word pronunciation service overlaps the business keyword provided by the business keyword service, the search result providing system 120 may give a higher priority to the business keyword service so that the overlapping original word or allomorph is excluded. The exclusion may be performed in real time during service exposure. Although a list of priorities are provided in view of possible overlaps of services, the order of priorities are not limited thereto.

Thus, the standard for the data integration and the service exposure and the standard for the service exclusion have been explained. Hereinafter, a standard for data refinement will be described.

After the loan word pronunciation DB is established through the pronunciation search library, the search result providing system 120 may refine the data to provide a higher accuracy, using information on the QC of a keyword and a number of search results.

The QC may refer to a number of searches performed in an integrated search for a reference time period with respect to a keyword corresponding to the allomorph stored and maintained in the loan word pronunciation DB. That is, the lower a QC value, the lower a usage rate of the keyword may be considered.

The number of search results may refer to a number of documents including both the original word and the allomorph. That is, as a correlation between the original word and the allomorph is high, a probability that the original word and the allomorph are both present in one document is increased. Therefore, the larger the number of search results, the higher the correlation between the original word and the allomorph may be considered.

Figure 2:
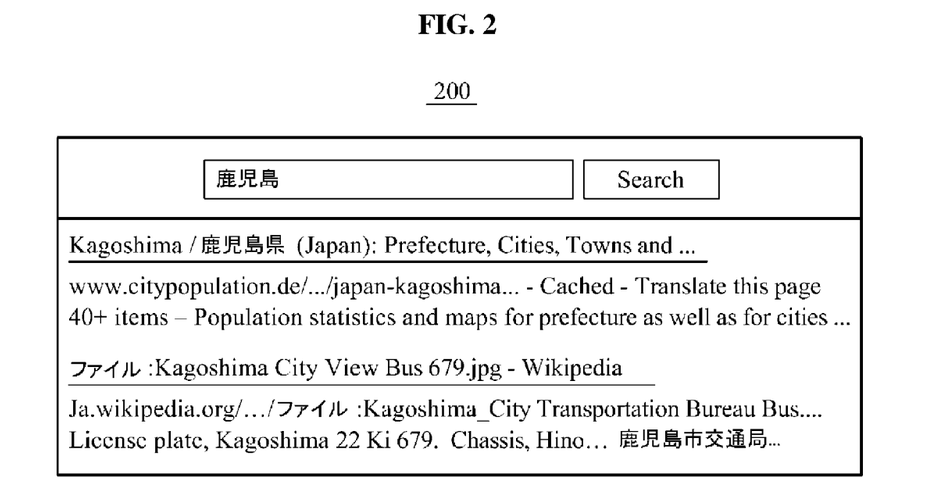
FIG. 2 is a diagram illustrating a search result for an original word according to an exemplary embodiment of the present invention.

FIG. 2 illustrates a search result for an original word according to an exemplary embodiment of the present invention.

A screen 200 shows documents including both an original word '鹿児島' and an allomorph 'Kagoshima' of the original word. Here, the screen 200 shows an example in which the number of documents including both the original word '鹿児島' and the allomorph 'Kagoshima' is '2.'

If a document fails to include both of the original word and the allomorph, the number of search results may be determined to be '0.'

Table 3 shows the QC and the number of search results according to the original word and the allomorph.

TABLE 3

| Original word | Allomorph | QC | Number of search results |
|---|---|---|---|
| 鹿児島 | Gagoshima | 0 | 0 |
| 鹿児島 | Kagosima | 0 | 21 |

TABLE 3-continued

| Original word | Allomorph | QC | Number of search results |
|---|---|---|---|
| 鹿兒島 | Kagoshima | 581 | 37 |
| 김연아 | Kim Yeona | 5424 | 0 |

Referring to FIG. 1, the search result providing system 120 may refine the data by combining the QC and the number of search results. The combination result may be classified as follows.

(1) When the QC is 0 and the number of search results is also 0: The usage rate of the keyword is very low and the correlation between the original word and the allomorph is also low.

(2) When the QC is 0 and the number of search results is at least 1: The usage rate of the keyword is low but the original word and the allomorph are correlated.

(3) When the QC is at least 1 and the number of search results is 0: The keyword is used but the correlation between the original word and the allomorph is low.

(4) When the QC is at least 1 and the number of search results is also at least 1: The keyword is used and the original word and the allomorph are correlated.

Here, the search result providing system 120 may automatically refine, that is, remove the allomorph according to the classification (1) to (4). For example, the search result providing system 120 may determine an allomorph corresponding to the classification (1) and (3) to be not a proper pairing of an original word and an allomorph and thus, remove the allomorph. The search result providing system 120 may use an allomorph corresponding to the classification (4) as a service object since the corresponding allomorph has some probability of being a right pair of original word and allomorph. Also, the search result providing system 120 may use an allomorph corresponding to the classification (2) as a service object since the corresponding allomorph has some probability of being a proper pairing of an original word and an allomorph. That is, based on the QC and the number of search results, a probability that a corresponding allomorph is a proper allomorph may be high in order of allomorphs corresponding to classifications (4), (2), (3) and (1).

One keyword may be redundantly extracted from a plurality of sources. For example, the keyword may be extracted as the standard orthography. Also, the same keyword may be extracted through a biographic dictionary. In this case, the search result providing system 120 may allow all relevant sources rather than limiting the source of the keyword to one source. Here, the search result providing system 120 may allocate an identification (ID) number to each source and store a sum of the ID numbers of sources corresponding to the keyword. Table 4 shows ID numbers according to corresponding sources. Each source in Table 4 may correspond to a DB defined by a source name.

TABLE 4

| Source | ID No. |
|---|---|
| Master | $2^{10}$ |
| Standard orthography | $2^9$ |
| Standard loan word | $2^8$ |
| Person | $2^7$ |
| Shopping/Fashion | $2^6$ |
| Vehicle | $2^5$ |
| Travel | $2^4$ |
| Pet dog | $2^3$ |

TABLE 4-continued

| Source | ID No. |
|---|---|
| Art terms | $2^2$ |
| English dictionary | $2^1$ |
| French dictionary | $2^0$ |

Figure 3:
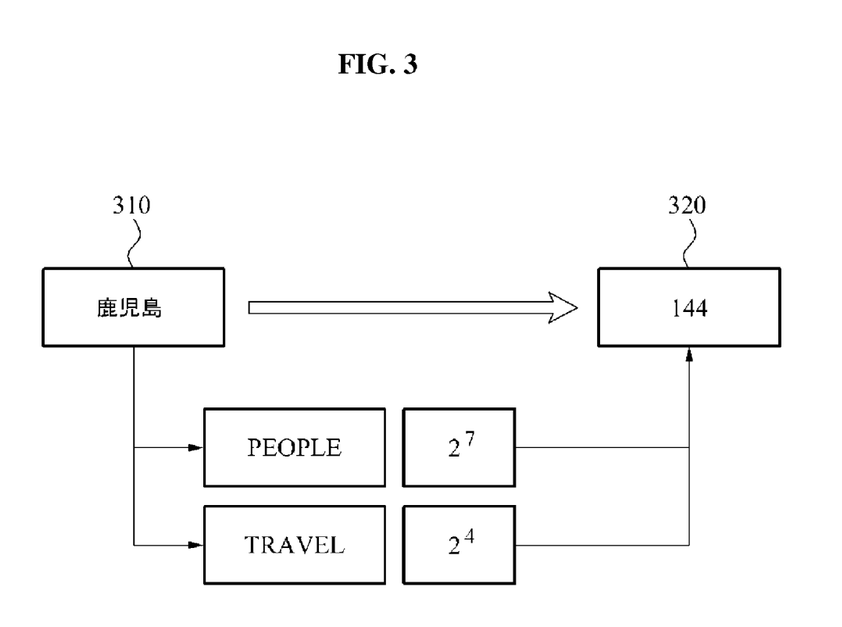
FIG. 3 is a diagram illustrating a method for maintaining a plurality of sources according to an exemplary embodiment of the present invention.

FIG. 3 illustrates a method for maintaining a plurality of sources, according to an exemplary embodiment of the present invention.

A set of an original word '鹿兒島' 310 and an allomorph 'Kagoshima' may be withdrawn from the 'Travel' source. However, considering only the original word '鹿兒島' 310, the set may be withdrawn from the 'Person' source and the 'Travel' source as shown in Table 5.

TABLE 5

| ID | Original word | Allomorph | Source |
|---|---|---|---|
| $2^7$ | 鹿兒島 | Kagosima | Person |
| $2^4$ | 鹿兒島 | Kagoshima | Travel |

In this case, to maintain two sources of the original word '鹿兒島', the search result providing system 120 of FIG. 1 may calculate 144 as a sum of two ID numbers $2^4$ and $2^7$ of the two sources. That is, in addition to the search result providing system 120, another system in association with the search result providing system 120 or a system manager may obtain information on some or all of the two sources related to the original word '鹿兒島' using the sum '144' 320. For example, the sum '144' 320 may be expressed by a binary number '00010010000', in which positions corresponding to values '1' may represent the two sources. Therefore, original source information may be obtained without deletion of data, rather than by using one source matching one keyword.

A source may be divided into an upper source and a lower source. For example, a 'Person' source, that is, a first detail source, may have a 'Topic' source as the upper source and an 'Actor' source as a second detail source or the lower source. Although Table 5 introduces the ID numbers with respect to the first detail source, the sources and the ID numbers according to the sources may be determined according to a source classification method. For example, the ID numbers may be used with respect to upper sources of first sources or with respect to lower sources of the first sources. Also, the ID numbers may be determined for some or all sources and used.

The information on sources may be retained for two purposes. First, to determine whether a service condition about a source in which frequency of clicks on keywords is higher than a reference threshold. Second, to determine whether a service quality may be controlled based on the frequency of clicks per source. That is, a keyword from a source having a low frequency of clicks may be considered to have a low quality. Accordingly, data exposure of the corresponding source may be controlled. Conversely, regarding a source having a high frequency of clicks, logic may be applied such that data of the source is exposed as a high priority. Accordingly, the exposure priority of data having a high user satisfaction may be increased.

Referring to FIG. 1, the search result providing system 120 may provide the user with the search result 140 through the user terminal 110. For example, if the search result providing system 120 is an Internet search result providing system and if the search result providing system 120 and the user terminal 110 are connected as separate systems through a wired or wireless network, the search result providing system 120 may generate a search result page including the search result 140 and provide the search result page to the user terminal 110. Thus, the search result 140 may be provided to the user through the user terminal 110.

Figure 4:
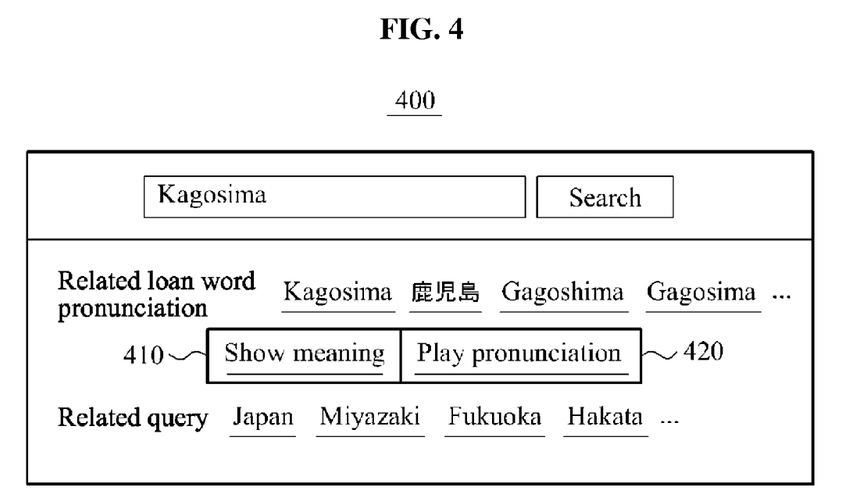
FIG. 4 is a diagram illustrating a webpage providing a loan word pronunciation service as a search result according to an exemplary embodiment of the present invention.

FIG. 4 illustrates a webpage providing the loan word pronunciation service as a search result according to an exemplary embodiment of the present invention.

That is, a search result page 400 shows a part of the webpage that provides the search result 140 in response to the query 130 as shown in FIG. 1. In this case, by providing the original word and the allomorphs related to the loan word 'Kagoshima', the search result providing system 120 may provide various allomorphs of the loan word, which may be based on similar pronunciations, to the user inputting the loan word as a query.

In addition, the pronunciations of the loan word may include an allomorph the user already knows and an allomorph the user newly learns through searches by other users. Since the original word and the allomorphs may be related in terms of the pronunciation rather than their meaning, the user may wonder whether the original word or the allomorphs have the same meaning as the loan word provided in the query or wonder about the meaning of the loan word provided in the query. Accordingly, the search result providing system 120 may also provide a definitional content to display the meaning of a selected word and a voice pronunciation service to provide pronunciation of a selected word. A 'show meaning' link or icon 410, which may provide a definitional content of a selected word or a meaning showing operation, and a 'play pronunciation' link or icon 420, which may provide a voice pronunciation service of a selected word or a pronunciation playing operation, may be provided in a layer form upon mouse-over on the keyword of the loan word pronunciation.

Figure 5:
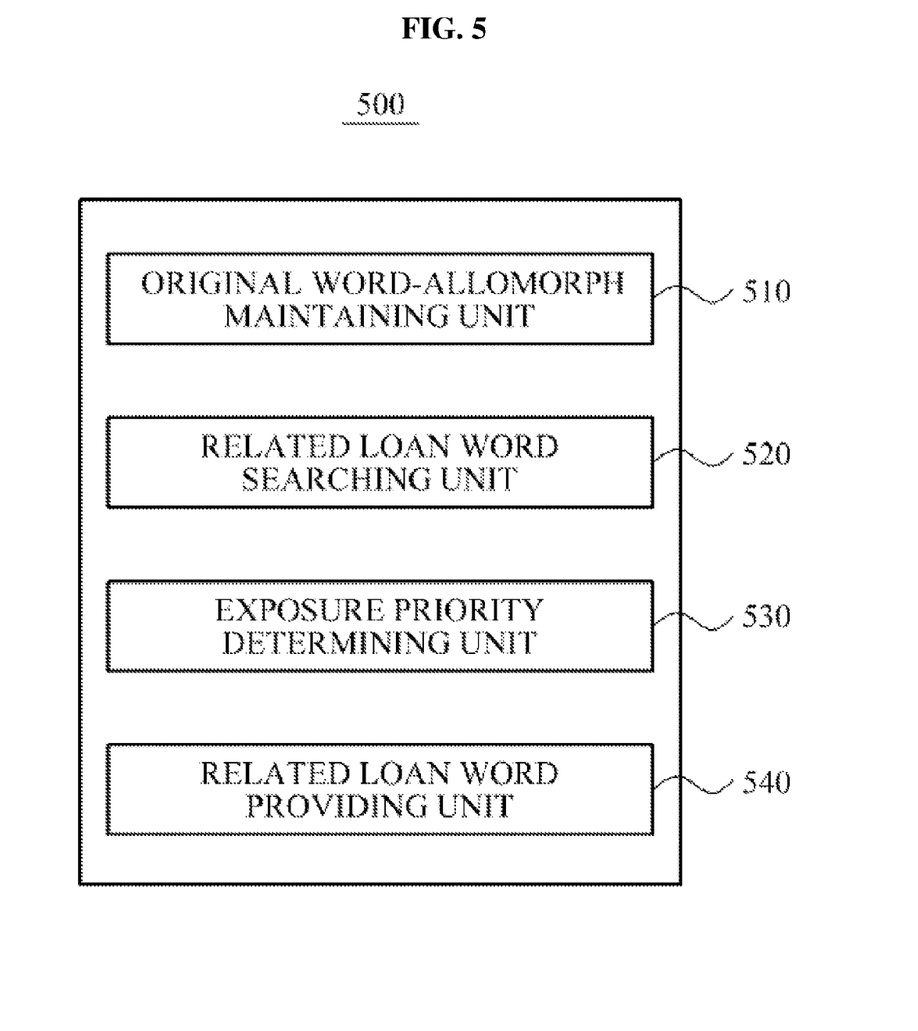
FIG. 5 is a block diagram illustrating an inner structure configuration of a search result providing system according to an exemplary embodiment of the present invention.

FIG. 5 illustrates an inner structure configuration of a search result providing system 500 according to an exemplary embodiment of the present invention.

The search result providing system 500 corresponds to the search result providing system 120 of FIG. 1. As shown in FIG. 5, the search result providing system 500 includes an original word-allomorph maintaining unit 510, a related loan word searching unit 520, a related loan word providing unit 540, and an exposure (display) priority determining unit 530.

The original word-allomorph maintaining unit 510 may store and maintain, in a DB, a set of original words corresponding to a loan word, and allomorphs of the original word based on pronunciation relations. For example, the original word-allomorph maintaining unit 510 may store and maintain in the DB an original word '鹿児島' and a set of allomorphs {Kagoshima, Kagosima, Gagoshima, Gagosima} related to the original word '鹿児島', which may be related in pronunciation, as shown in Table 1.

If a query transmitted through a user terminal includes the original word, the related loan word searching unit 520 may search for at least one related loan word corresponding to the original word or the allomorph stored in the DB, which may be related in pronunciation to the original word. If the query includes one allomorph related to the original word, the related loan word searching unit 520 may search for at least one related loan word corresponding to the original word or the other allomorphs related to the original word and stored in the DB. Further, the related loan word searching unit 520 may determine a source of the related loan word.

Here, the related loan word searching unit 520 may search for a related loan word and other related allomorphs stored in the DB that may be related in pronunciation to the original word. For example, if the original word '鹿児島' is included in the query transmitted through the user terminal, the related loan word searching unit 520 may search for an allomorph included in the set of the allomorphs, which includes {Kagoshima, Kagosima, Gagoshima, Gagosima}, as the related loan word.

In addition, if the query transmitted includes an allomorph or a loan word corresponding to the original word, the related loan word searching unit 520 may search the DB for at least one original word, which may have pronunciation relations with the queried allomorph or loan word, related allomorphs, which may have pronunciation relations with the stored original word or the queried word, as the at least one related loan word. For example, referring to Table 3, if the allomorph 'Kagoshima' is included in the query transmitted through the user terminal, the related loan word searching unit 520 may search for the original word '鹿児島', which may be related in pronunciation to the allomorph 'Kagoshima', and the allomorphs 'Kagosima,' 'Gagoshima,' and 'Gagosima', which may also be related in pronunciation to the original word '鹿児島' or the queried allomorph 'Kagoshima', as the related loan word. More specifically, one of the provided allomorphs may be the loan word corresponding to the original word. If different original words correspond to allomorphs of an identical or similar pronunciation, the different original words and allomorphs corresponding to the different original words may be searched for as the related loan word.

Also, the related loan word searching unit 520 may refine the data by deleting at least one original word or allomorph from the DB using at least one of a QC, which may denote is a number of queries using inputs of the original word or the allomorph, and a number of search results, which may denote a number of documents including both the original word and the allomorph. Here, the related loan word searching unit 520 may classify the original word or the allomorph into groups according to presence of the QC or presence of the number of search results, and may refine the data by deleting the original word or the allomorph belonging to a predetermined group among the groups from the DB. Since such data refinement is already described in detail with reference to Table 4 and the classifications (1) to (4), a detailed description will not be repeated.

The related loan word providing unit 540 may provide the at least one related loan word being searched to the user terminal. For example, if the user terminal is included in the search result providing system 500 and includes a module with input and output interfaces, the related loan word providing unit 540 may expose or display the related loan word along with the search result through the output interface, thereby providing the related loan word to the user who inputs the query through the input interface of the user terminal. However, in another exemplary embodiment, if the user terminal is a separate system from the search result providing system 500 and transmits the query via a wired or wireless network, the related loan word providing unit 540 may transmit the related loan word together with the search result related to the query through the wired and wireless network. For example, the related loan word providing unit 540 may add the search result related to at least one related loan word being searched to a webpage that provides the search result of the query, and provides the user terminal with the webpage including the at least one related loan word, thereby providing the at least one related loan word. Here, if a user event occurs in an area on the webpage, the area including the related loan word, at least one operation between the meaning showing operation and the pronunciation playing operation about the related loan word may be provided to the user terminal.

The exposure priority determining unit 530 may determine an exposure priority for at least one related loan word, which may include allomorphs corresponding to the original word or the queried allomorph, being searched. For this, the exposure priority determining unit 530 may use at least one of the QC, which may denote a number of queries using inputs of the original word or the allomorph, and a source of the original word or the allomorph. Here, as aforementioned, the source may be determined according to a DB, from which the original word or the allomorph may be extracted. For example, the exposure priority determining unit 530 may allocate a weight to the QC according to the source, and determine the exposure priority based on the QC allocated with the weight. As another example, while determining the exposure priority according to the source, the exposure priority determining unit 530 may determine the exposure priority according to the QC with respect to the original word or the allomorph having the same source.

If the exposure priority is used in this manner, the related loan word providing unit 540 may provide at least one related loan word according to the exposure priority. For example, the related loan word may be listed on the webpage providing the search result in order of the exposure priority.

The search result providing system 500 may further include a related query providing unit (not shown) to provide a related query associated with the original query. If the related query and the related loan word overlap each other, the overlapping related query may be excluded from the search result. In addition, the search result providing system 500 may further include a business keyword providing unit (not shown) to provide a business keyword which is a related keyword of an ad keyword. If the business keyword related to the query and the related loan word overlap each other, the overlapping related loan word may be excluded from the search result. Since the method of deleting the overlapping word is already described in detail with reference to FIG. 1, a description about the method will not be repeated.

Furthermore, the source of the original word or the allomorph may be displayed using a sum of the ID numbers allocated according to the source of the original word or the allomorph. In this case, the source may be determined according to a DB from which the original word or the allomorph is determined. Here, each of the ID numbers may be expressed by a binary number having a value 1 in one particular position. Since the method of displaying the source is already explained in detail with reference to Table 5 and FIG. 3, a detailed description will be omitted.

Figure 6:
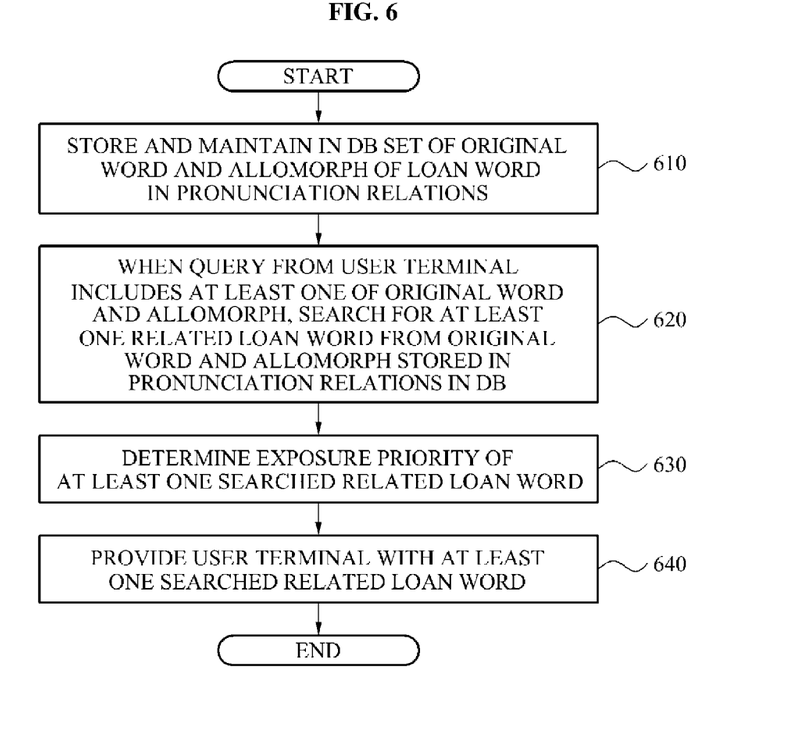
FIG. 6 is a flowchart illustrating a search result providing method according to an exemplary embodiment of the present invention.

FIG. 6 illustrates a search result providing method according to an exemplary embodiment of the present invention, which may be performed by the search result providing system 500 described with reference to FIG. 5. That is, FIG. 6 will illustrate respective operations performed in the search result providing system 500. Here, the search result providing system 500 may selectively perform operation 630 shown in FIG. 6.

In operation 610, the search result providing system 500 may store and maintain, in a DB, a set of an original word corresponding to a loan word, and one or more allomorphs of the original word, or the loan word, which may be related in pronunciation. For example, the search result providing system 500 may store and maintain in the DB an original word '鹿児島' and a set of allomorphs {Kagoshima, Kagosima, Gagoshima, Gagosima} related to the original word '鹿児島' related in pronunciation as shown in Table 1.

In operation 620, if a query transmitted through a user terminal includes an original word or an allomorph, the search result providing system 500 may search for at least one related loan word from the original word or the allomorph stored in the DB, which may have pronunciation relations with the original word or the allomorph that was included in the query or a query word.

Here, if the query word is the original word, the search result providing system 500 may search, as the related loan word, for the allomorph stored in the DB having pronunciation relations with the original word. For example, if the original word '鹿児島' is included in the query transmitted through the user terminal, the search result providing system 500 may search for the allomorph included in the set of the allomorphs {Kagoshima, Kagosima, Gagoshima, Gagosima} as the related loan word.

In addition, if the query word is an allomorph of the original word, the search result providing system 500 may search the DB for the original word having pronunciation relations with the allomorph, and other allomorphs, which may also have pronunciation relations with the stored original word, as the related loan word. For example, referring to Table 3, if the allomorph 'Kagoshima' is included in the query transmitted through the user terminal, the search result providing system 500 may search for the original word '鹿児島' having pronunciation relations with the allomorph 'Kagoshima', and other allomorphs 'Kagosima,' 'Gagoshima,' and 'Gagosima', which may also have pronunciation relations with the original word '鹿児島', as the at least one related loan word. If different original words have allomorphs of an identical or similar pronunciation, the different original words and allomorphs corresponding to the different original words may be searched for as the related loan word.

Also, the search result providing system 500 may refine the data by deleting at least one original word or allomorph from the DB using at least one of a QC, which may denote a number of queries using inputs of the original word or the allomorph, and a number of search results, which may denote a number of documents including both the original word and the allomorph. Here, the search result providing system 500 may classify the original word or the allomorph into groups according to presence of the QC or presence of the number of search results, and may refine the data by deleting the original word or the allomorph belonging to a predetermined group among the groups from the DB. Since such data refinement is already described in detail with reference to Table 4 and the classifications (1) to (4), a detailed description will not be repeated.

In operation 640, the search result providing system 500 may provide the user terminal with at least one related loan word being searched. For example, if the user terminal is included in the search result providing system 500 and includes a module with input and output interfaces, the search result providing system 500 may expose or display the related loan word together with the search result through the output interface of the user terminal, thereby providing the related loan word to the user who inputs the query through the input interface of the user terminal. However, in another exemplary embodiment, if the user terminal is a separate system from the search result providing system 500 and transmits the query via a wired or wireless network, the search result providing system 500 may transmit the related loan word together with the search result related to the query through the wired and wireless network. For example, the search result providing system 500 may add the search result related to at least one related loan word being searched to a webpage that provides the search result of the query, and provide the user terminal with the webpage including the at least one related loan word, thereby providing the at least one related loan word. Here, if a user event occurs in an area on the webpage, the area including the related loan word, at least one operation between a meaning showing operation and a pronunciation playing operation about the related loan word may be is provided to the user terminal.

In operation 630, the search result providing system 500 may determine an exposure priority for at least one related loan word, which may include allomorphs corresponding to the original word or the queried allomorph, being searched. For this, the search result providing system 500 may use at least one of the QC, which may denote a number of queries using inputs of the original word or the allomorph, and a source of the original word or the allomorph. Here, as aforementioned, the source may be determined according to a DB from which the original word or the allomorph may be extracted. For example, the search result providing system 500 may allocate a weight to the QC according to the source, and determine the exposure priority based on the QC allocated with the weight. As another example, while determining the exposure priority according to the source, the search result providing system 500 may determine the exposure priority according to the QC with respect to the original word or the allomorph having the same source.

If the exposure priority is thus used, the search result providing system 500 may provide at least one related loan word according to the exposure priority, in operation 640. For example, the related loan word may be listed on the webpage providing the search result in order of the exposure priority.

The search result providing system 500 may further perform providing a related query associated with the original query. If the related query and the related loan word overlap each other, the overlapping related query may be excluded from the search result. In addition, the search result providing system 500 may further perform providing a business keyword which is a related keyword of an ad keyword. If the business keyword related to the query and the related loan word overlap each other, the overlapping related loan word may be excluded from is the search result. Since the method of deleting the overlapping word is already described in detail with reference to FIG. 1, a description about the method will not be repeated.

The source of the original word or the allomorph may be displayed using a sum of ID numbers allocated according to the source of the original word or the allomorph. As aforementioned, the source may be determined according to a DB from which the original word or the allomorph is determined. Here, each of the ID numbers may be expressed by a binary number having a value 1 in one particular position. Since the method of displaying the source is already explained in detail with reference to Table 5 and FIG. 3, a detailed description will be omitted.

The omitted contents of FIG. 5 and FIG. 6 may be understood by referring to FIG. 1, FIG. 2, FIG. 3, and FIG. 4.

As described above, according to exemplary embodiments of the present invention, various pronunciations of a loan word may be provided to a user who inputs the loan word as a query. To be more specific, a loan word may refer to an original word written in a first language that is transliterated into a word in a second language to have the same or similar pronunciation. The loan word may refer to an accepted spelling in the second language. However, since the loan word does not have a meaning of its own, but spelled to have the same or similar pronunciation as the original word, the original word may have allomorphs, which may be similar to the loan word in pronunciation but have variations in spelling. A set of the allomorphs with respect to the original word may be correlated by pronunciation relations, and stored and maintained in a DB. If a query including the original word or at least one of the allomorphs is inputted by the user, the original word or the allomorph with the pronunciation relations is provided to the user. Thus, the user may be provided with various spellings of the loan word. In addition, exposure or display of the original word or the allomorph and the exposure priority may be determined based on at least one of a QC, a source of the original word or the allomorph, and a number of search results. Also, the present service condition about a source in which frequency of clicks on keywords is high may be checked by maintaining information on the source of the allomorph. Furthermore, service quality may be controlled based on the frequency of clicks per source.

According to the exemplary embodiments of the present invention, a search result may be provided related to various pronunciations of a loan word for a user who inputs a loan word as a query.

Also, according to the exemplary embodiments of the present invention, a set of allomorphs of an original word of a loan word may be stored and maintained. The allomorphs may be correlated in relation to pronunciation with respect to the loan word related to the original word and the allomorphs. The loan word may refer to transliteration of the original word into a native language, and the original word or the allomorph may be related in pronunciation. Therefore, a system and method for providing a user with a search result related to various pronunciations of a loan word may be provided.

According to the exemplary embodiments of the present invention, whether to expose an original word or an allomorph and an exposure priority may be determined based on at least one of a QC, a source of the original word or the allomorph, and a number of search results.

In addition, according to the exemplary embodiments of the present invention, the present service condition about a source, in which frequency of clicks on keywords is higher than a reference threshold, may be checked by maintaining information on the source of the allomorph. Also, service quality may be controlled based on the frequency of clicks per source.

The exemplary embodiments according to the present invention may be recorded in a non-transitory computer-readable media including program instructions to implement various operations embodied by a computer. The media may also include, alone or in combination, the program instructions, data files, data structures, and the like. The media and program instructions may be those specially designed and constructed for the purposes of the present invention, or they may be of the kind well-known and available to those having skill in the computer software arts. The above file system may also be recorded in computer-readable recording media.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A search result providing system including at least one processor, comprising:
   a storage device;
   one or more units, executable by the processor using programs, stored in the storage device, the one or more units comprising:
   an original word-allomorph maintaining unit configured to store a plurality of predetermined pronunciation relationships, wherein each relationship includes an original word, a loan word comprising a transliterated word corresponding to the original word, and one or more allomorphs of the original word in the storage device;

a related loan word searching unit configured, upon receipt of a query having at least one query word including at least one of an original word, a loan word, and one or more allomorphs, to identify at least one related loan word from an original word, a loan word, and one or more allomorphs within the same predetermined pronunciation relationship as the at least one query word;

an exposure priority determining unit configured to determine an exposure priority of the at least one related loan word according to a query count of the at least one related loan word; and a related loan word providing unit configured to provide the at least one related loan word as a search result according to the exposure priority.

2. The search result providing system of claim 1, wherein the related loan word searching unit is configured to determine the at least one related loan word, stored in the original word-allomorph maintaining unit, based on a pronunciation relation between the one or more allomorphs and the query if the query comprises the original word.

3. The search result providing system of claim 1, wherein, if the query comprises the one or more allomorphs of the original word, the related loan word searching unit is configured to search the original word-allomorph maintaining unit to determine one of the original word or the one or more allomorphs as the at least one related loan word.

4. The search result providing system of claim 1, wherein the exposure priority determining unit is configured to determine the exposure priority based on a query count (QC) denoting a number of inputs of the original word or the one or more allomorphs in the query, and a source from which the original word or the one or more allomorphs are extracted in response to the query.

5. The search result providing system of claim 4, wherein the exposure priority determining unit is configured to allocate a weight to the QC according to the source and determine the exposure priority based on the QC allocated with the weight.

6. The search result providing system of claim 4, wherein the exposure priority determining unit is configured to determine the exposure priority according to the source and the QC if the original word and the one or more allomorphs have the same source.

7. The search result providing system of claim 1, further comprising:
a related query providing unit configured to provide a related query associated with the query, wherein, if the related query overlaps the at least one related loan word, the related query overlapped with the at least one related loan word is excluded from the search result.

8. The search result providing system of claim 1, further comprising:
a business keyword providing unit configured to provide a business keyword, wherein the business keyword comprises a related keyword related to an advertisement keyword if the query is set to the advertisement keyword, and the search result is provided excluding the loan word which overlaps the business keyword with respect to the query.

9. The search result providing system of claim 1, wherein the original word-allomorph searching unit is configured to delete at least one of the original word and the one or more allomorphs based on at least one of a QC, which denotes a number of inputs of the original word, the one or more allomorphs as the query, and a number of search results, which denotes a number of documents including both the original word and the one or more allomorphs in the search result.

10. The search result providing system of claim 9, wherein the related loan word searching unit is configured to classify the original word or the one or more allomorphs into a first group according to presence of the QC, or a second group according to presence of the number of search results, and delete the original word or the one or more allomorph belonging to a predetermined group among the groups from the storage device.

11. The search result providing system of claim 1, wherein the related loan word searching unit is configured to determine a source of the original word or the one or more allomorphs using a sum of identification (ID) numbers allocated to the respective sources, wherein the original word or the one or more allomorphs are identified according to a database from which the original word or the one or more allomorphs are extracted.

12. The search result providing system of claim 11, wherein each of the ID numbers is a binary number comprising a value 1 in at least one position.

13. The search result providing system of claim 1, wherein the related loan word providing unit is configured to add the at least one related loan word being found to a webpage that provides the search result corresponding to the query, and provide the webpage comprising the at least one related loan word to a terminal.

14. The search result providing system of claim 13, wherein the webpage comprising the at least one related loan word comprises at least one of a meaning showing operation and a pronunciation playing operation associated with the at least one related loan word.

15. A search result providing method using a processor, the method comprising:
storing, in a database (DB), a plurality of predetermined pronunciation relationships, wherein each pronunciation relationship includes an original word, a loan word comprising a transliterated word corresponding to the original word, and one or more allomorphs of the original word;
identifying, by the processor, at least one related loan word, upon receipt of a query having at least one query word including at least one of an original word, a loan word, and one or more allomorphs, from an original word, a loan word, and one or more allomorphs within the same pronunciation relationship as the at least one query word;
determining an exposure priority of the at least one related loan word according to a query count of the at least one related loan word; and
providing the at least one related loan word as a search result on a terminal according to the exposure priority.

16. The search result providing method of claim 15, wherein the one or more allomorphs are the at least one related loan word if the query includes the original word.

17. The search result providing method of claim 15, wherein, if the query comprises the one or more allomorphs of the original word, the at least one related loan word comprises at least one of the original word and the one or more allomorphs.

18. The search result providing method of claim 15, further comprising:
determining an exposure priority of the at least one related loan word,
wherein the at least one related loan word, as the search result, is exposed according to the exposure priority.

19. A non-transitory computer-readable medium comprising an executable program, which when executed by a processor, performs a method for providing a search result, the method comprising:

storing, in a database (DB), a plurality of predetermined pronunciation relationships, wherein each pronunciation relationship includes an original word, a loan word comprising a transliterated word corresponding to the original word, and one or more allomorphs of the original word;

identifying, by the processor, at least one related loan word, upon receipt of a query having at least one query word including at least one of an original word, a loan word, and one or more allomorphs, from an original word, a loan word, and one or more allomorphs within the same pronunciation relationship as the at least one query word;

determining an exposure priority of the at least one related loan word according to a query count of the at least one related loan word; and     providing the at least one related loan word as a search result on a terminal according to the exposure priority.

\* \* \* \* \*